United States Patent
Saukaitis et al.

(10) Patent No.: US 8,911,570 B2
(45) Date of Patent: *Dec. 16, 2014

(54) SUPPORTED GAS SEPARATION MEMBRANE AND METHOD

(75) Inventors: John Charles Saukaitis, Katy, TX (US); Ashley Renee Villarreal, Houston, TX (US)

(73) Assignee: Shell Oil Company, Houston, TX (US)

( * ) Notice: Subject to any disclaimer, the term of this patent is extended or adjusted under 35 U.S.C. 154(b) by 441 days.

This patent is subject to a terminal disclaimer.

(21) Appl. No.: 13/071,320

(22) Filed: Mar. 24, 2011

(65) Prior Publication Data

US 2011/0232821 A1    Sep. 29, 2011

Related U.S. Application Data

(60) Provisional application No. 61/317,894, filed on Mar. 26, 2010.

(51) Int. Cl.
*C22F 1/10* (2006.01)

(52) U.S. Cl.
USPC ............................................. 148/527; 95/56

(58) Field of Classification Search
USPC ........................................ 95/55, 56; 148/527
IPC ................. C23C 18/1806,22/78; B01D 71/022, B01D 67/0055
See application file for complete search history.

(56) References Cited

U.S. PATENT DOCUMENTS

| 3,505,180 | A | 4/1970 | Brogden | 204/35 |
| 7,175,694 | B2 | 2/2007 | Ma et al. | 95/56 |
| 8,167,976 | B2 * | 5/2012 | Del Paggio et al. | 95/55 |
| 8,721,773 | B2 * | 5/2014 | Perkins et al. | 96/11 |
| 2009/0120287 | A1 | 5/2009 | Del Paggio et al. | 95/56 |
| 2009/0120293 | A1 | 5/2009 | Saukaitis | 96/11 |

FOREIGN PATENT DOCUMENTS

| EP | 1208904 | 5/2002 | ............ B01D 71/02 |
| JP | 2008086910 | 4/2008 | ............ B01D 69/10 |
| WO | WO2008118560 | 10/2008 | ............ B01D 53/22 |
| WO | WO 2008118560 A1 * | 10/2008 | |

* cited by examiner

*Primary Examiner* — Weiping Zhu
(74) *Attorney, Agent, or Firm* — Charles W. Stewart

(57) ABSTRACT

A method of making a gas separation membrane system by providing a porous support material having deposited thereon a metal membrane layer and imposing upon the surface thereof certain surface characteristics that provide for surface activation that enhances the placement thereon of a subsequent metal membrane layer. The gas separation membrane system is useful in the separation of hydrogen from hydrogen-containing gas streams.

10 Claims, 3 Drawing Sheets

SUPPORTED GAS SEPARATION MEMBRANE AND METHOD

Figure 1:
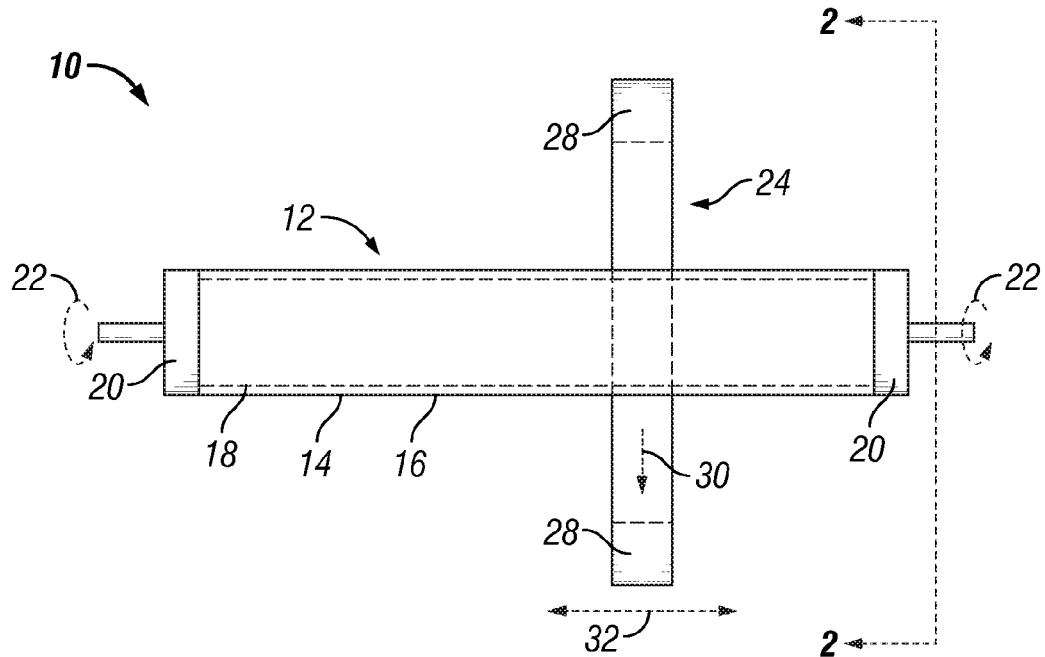

This application claims the benefit of U.S. Provisional Application No. 61/317,894 filed Mar. 26, 2010, the entire disclosure of which is hereby incorporated by reference.

The present disclosure relates generally to composite gas separation modules used to separate a specific gas from a mixture of various gases, and, in particular, to methods of manufacturing and reconditioning such modules.

Composite gas separation modules are commonly used to selectively separate specific gases from gas mixtures. These composite gas separation modules can be made of a variety of materials, but the two most commonly used materials are polymers and metallic composites. While polymer membranes can provide an effective and cost-efficient option for the separation of gases at low temperatures, they are often unsuitable for gas separation processes that require higher temperatures and pressures; because, they tend to thermally decompose. The demand for high-temperature processing, along with tighter environmental regulations, requires composite gas separation modules that provide high flux, high selectivity, and the ability to operate at elevated temperatures.

The prior art discloses various types of and methods for making gas separation membranes that are supported upon porous substrates and that may be used in high temperature gas separation applications. Many of the known techniques for depositing thin, dense, gas-selective membrane layers onto porous substrates use techniques that often leave a surface that is not uniform in thickness. One of these techniques is described in U.S. Pat. No. 7,175,694. This patent discloses a gas separation module that comprises a porous metal substrate, an intermediate porous metal layer, and a dense hydrogen-selective membrane. The patent teaches that the intermediate porous metal layer may be abraded or polished to remove unfavorable morphologies from its surface, and, thereafter, a dense gas-selective metal membrane layer is deposited. Although the patent suggests that the purpose of the abrading or polishing of the intermediate porous metal layers is to remove unfavorable morphologies from its surface, there is no suggestion that such abrading or polishing may be used for the purpose of creating a membrane layer with a surface morphology so that additional activation is not required. There is further no suggestion that the abrading or polishing is to be done so as to impose the intermediate metal layer a certain surface roughness in order to improve the subsequent deposition of a gas-selective metal membrane layer.

One method for fabricating a palladium composite gas separation module is disclosed in U.S. Patent Publication No. 2009/0120287, which presents a method of making a metallic composite gas separation membrane system. The membrane system can comprise a porous support, a first membrane layer of a gas-selective material overlying the porous support where a substantial portion of the membrane layer is removed by the use of an ultra-fine abrasive to reduce the membrane thickness, and a second layer of a gas-selective material overlaying the reduced membrane layer. The first membrane layer may comprise palladium that is deposited by multiple plating cycles. This palladium membrane layer is then abraded to remove a substantial portion of the membrane to reduce its thickness and polished to a smoother finish. A second palladium layer is subsequently deposited onto the newly reduced layer. The abrading step provides for a reduction in the membrane thickness, but there is no mention of it providing for a special surface morphology having enhanced activation properties for the placement or deposition thereon of an additional metal membrane layer.

In many of the prior art methods of making metal membranes for use in gas separation that are supported upon a porous substrate, the surface of the porous substrate and the surfaces of the metal layers and membranes between each application thereof are required to be surface activated by contacting them with an activation solution. An example of such an activation solution includes a mixture of stannous chloride ($SnCl_2$), palladium chloride ($PdCl_2$), hydrochloric acid (HCl), and water. This method of activation often requires multiple applications of the activation solution with intervening drying and, even, annealing. These wash and dry steps are laborious, they produce hazardous aqueous wastes, and they require a substantial amount of time to complete.

It is, thus, desirable to have a method of making a supported metal membrane that is thin, dense and relatively uniform in thickness that may be used in the separation of gases.

It is further desirable for the method to allow for multiple metal plating steps in the manufacture of a supported metal membrane without the need for intermediate chemical activation of the surfaces of the support and of the intermediate metal membrane layers.

It is also desirable for the method to generate reduced amounts of waste products and volatile organic solvents in the manufacturing of a supported metal membrane.

Accordingly, the present invention is directed to a method of making a composite gas separation module. The method comprises the steps of: providing a porous support having a metal membrane layer; imposing onto the surface of the metal membrane layer a surface morphology that provides for an activated surface having enhanced activation properties for the placement thereon of a subsequent metal membrane layer; placing the subsequent metal membrane layer upon the activated surface; and annealing the subsequent metal membrane layer to provide an annealed metal layer.

In another aspect of the present invention, there is a system for making a composite gas separation module. The system comprises: a porous support having a metal membrane layer with a surface; means for imposing onto the surface and the metal membrane layer a surface morphology that provides for an activated surface having enhanced activation properties for the placement thereon of a subsequent metal membrane layer; means for placing a subsequent metal membrane layer upon the activated surface; and means for annealing the subsequent metal membrane layer to provide an annealed metal layer.

FIG. 1 presents a schematic depiction of a polishing system and a tube that is being polished of an embodiment of the present invention.

Figure 2:
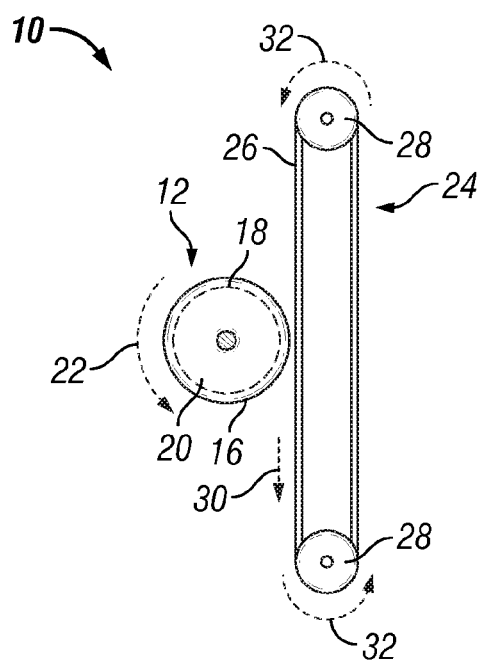

FIG. 2 presents a view of the polishing system and tube along section A-A of FIG. 1.

Figure 3:
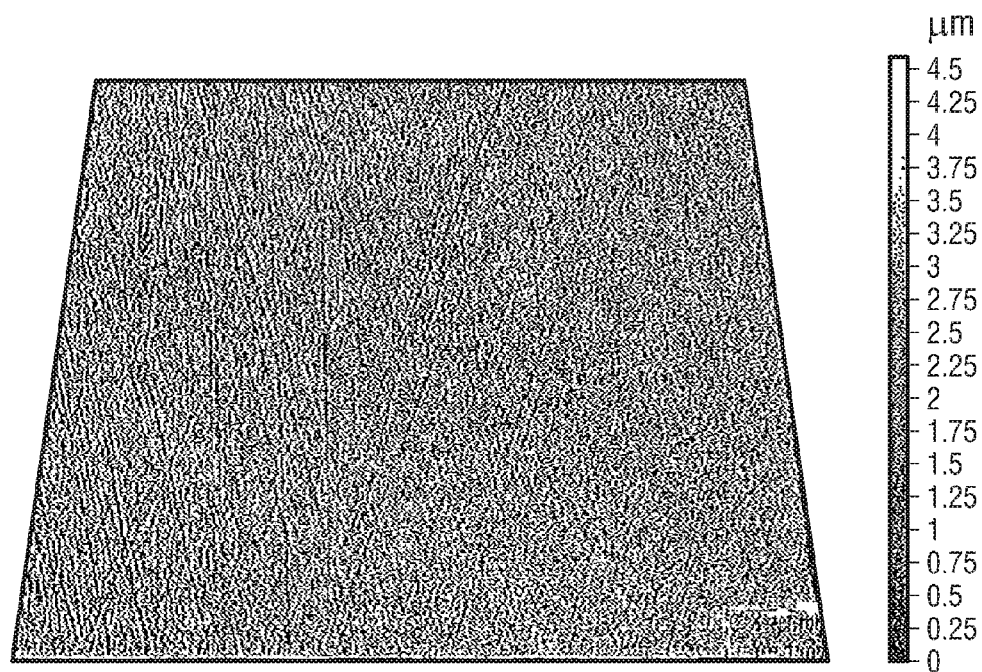

FIG. 3 presents an image obtained from an Nanovea optical profilometer of one example of the activated surface of the present invention.

Figure 4:
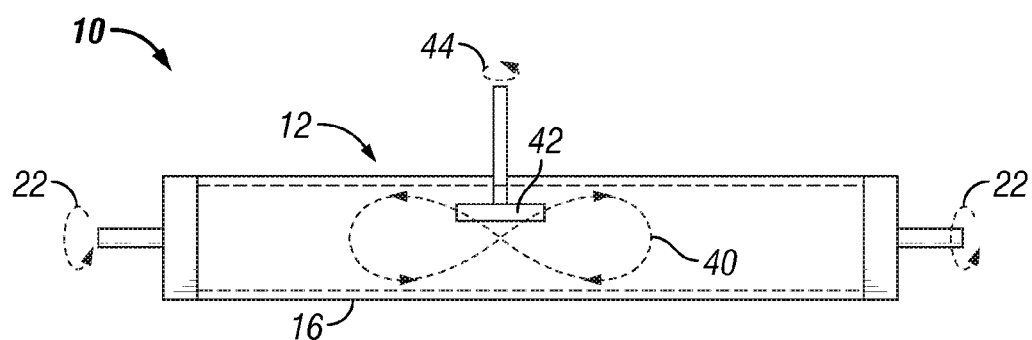

FIG. 4 presents a schematic depiction of a first polishing design created by a polishing system of the present invention.

Figure 5:
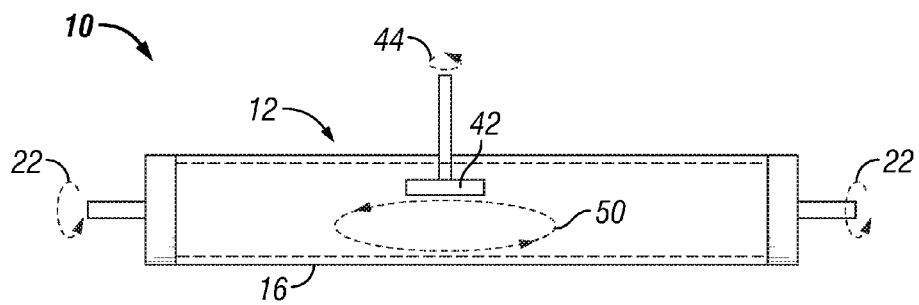

FIG. 5 presents a schematic depiction of a second polishing design created by a polishing system of the present invention.

Figure 6:
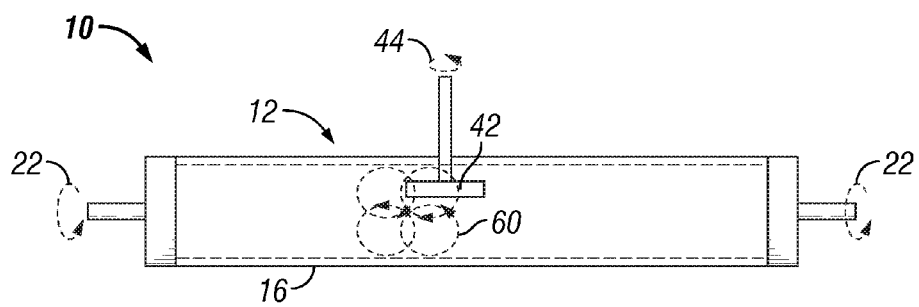

FIG. 6 presents a schematic of a third polishing design created by a polishing system of the present invention.

Figure 7:
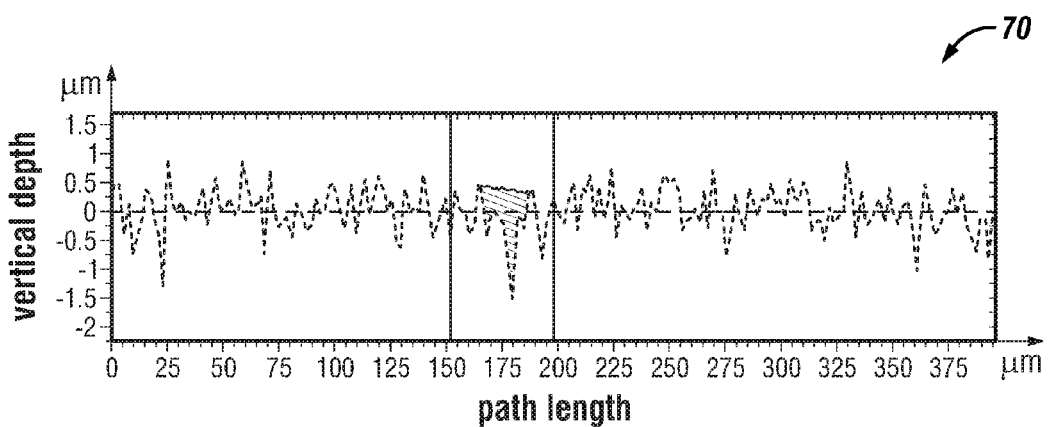

FIG. 7 is a representative profilometer trace taken at one location on the surface of a tube polished in accordance with the inventive method and showing certain of the features of the surface morphology of an activated surface.

The inventive method provides for the production of thin, dense gas-selective membranes by the use of multiple metal plating steps but without an intermediate treatment with an activation solution of the plated metal surfaces between the plating steps. The elimination of this surface activation by the use of an activation solution overcomes many of the problems associated with the prior art surface activation techniques. For instance, it mitigates some of the problems of slower and uneven metal plating that are caused by the use of an activation solution to activate the support and metal layer surfaces in the manufacture of a gas separation module.

The inventive method further provides for a reduction in the overall manufacturing time of a gas separation membrane module by the use of an activation technique that does not use a chemical activation solution to activate the surfaces of the support and plated metal layers of the gas separation module. Because no activation solution is utilized, there is no need to wash off activation solution between activation steps. This elimination of the use of an activation solution can provide an additional benefit of a more environmentally friendly process due to the reduction of aqueous wastes and volatile organic solvents that are typically generated by chemical activation methods.

Thus, the inventive method provides for the preparation, or reconditioning, or both, of a gas separation membrane system or a composite gas separation module. The inventive method may include placing a metal membrane layer of a gas-selective metal or material upon a porous support so as to provide a porous support and metal membrane layer having a surface which may be activated as described in detail herein so that a subsequent metal membrane layer may more easily be placed thereon.

The porous support upon which the gas-selective metal membrane layer is deposited may include any porous metal material that is suitable for use as a support for the gas-selective material and which is permeable by hydrogen. The porous support may be of any shape or geometry; provided, that, it has a surface that permits the layer of gas-selective material to be applied or deposited thereon. Such shapes can include planar or curvilinear sheets of the porous metal material having an undersurface and a top surface that together define a sheet thickness, or the shape of the porous substrate can be tubular, such as, for example, rectangular, square and circular tubular shapes that have an inside surface and an outside surface that together define a wall thickness and with the inside surface of the tubular shape defining a tubular conduit. In the preferred embodiment, the porous support is cylindrical.

The porous metal material can be selected from any of the materials known to those skilled in the art including, but not limited to, (1) the stainless steels, e.g., the 301, 304, 305, 316, 317, and 321 series of stainless steels, (2) the HASTELLOY® alloys, e.g., HASTELLOY® B-2, C-4, C-22, C-276, G-30, X and others, and (3) the INCONEL® alloys, e.g., INCONEL® alloy 600, 625, 690, and 718. The porous metal material, thus, can comprise an alloy that is hydrogen permeable and comprises iron and chromium. The porous metal material may further comprise an additional alloy metal such as nickel, manganese, molybdenum and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness as described above), porosity, and pore size distribution of the pores of the porous metal substrate are properties of the porous support selected in order to provide a gas separation membrane system of the invention that has the desired properties and as is required in the manufacture of the gas separation membrane system of the invention.

It is understood that, as the thickness of the porous support increases, the hydrogen flux will tend to decrease when the porous support is used in hydrogen separation applications. The operating conditions, such as pressure, temperature, and fluid stream composition, may also impact the hydrogen flux. In any event, it is desirable to use a porous support having a reasonably small thickness so as to provide for a high gas flux therethrough. The thickness of the porous substrate for the typical application contemplated hereunder can be in the range of from about 0.1 mm to about 25 mm. Preferably, the thickness is in the range of from 1 mm to 15 mm. More preferably, the range is from 2 mm to 12.5 mm, and most preferably, from 3 mm to 10 mm.

The porosity of the porous metal substrate can be in the range of from 0.01 to about 1. The term porosity is defined as the proportion of non-solid volume to the total volume (i.e., non-solid and solid) of the porous metal substrate material. A more typical porosity is in the range of from 0.05 to 0.8, and, even from 0.1 to 0.6.

The pore size distribution of the pores of the porous metal substrate can vary with the median pore diameter typically in the range of from about 0.1 micron to about 50 microns. More typically, the median pore diameter of the pores of the porous metal substrate material is in the range of from 0.1 micron to 25 microns, and most typically, from 0.1 micron to 15 microns.

In the inventive method, there is initially provided a porous support which has been prepared by placing a metal membrane layer of a gas-selective metal or material thereon by any suitable means or method known to those skilled in the art. Some of the suitable means and methods of preparing and forming a metal layer upon a support are as described in U.S. Pat. No. 7,175,694 and US Patent Publication 2009/0120287, both of which are incorporated herein by reference. Possible suitable means or methods for placing a metal membrane layer upon a support include, for example, the deposition of metal upon a surface by electroless plating, thermal deposition, chemical vapor deposition, electroplating, spray deposition, sputter coating, e-beam evaporation, ion beam evaporation and spray pyrolysis. A preferred deposition method is electroless plating.

The gas-selective metal or material, as the term is used herein, is a material that is selectively permeable to a gas when it is in a form of a dense (i.e., having a minimum amount of pinholes, cracks, void spaces, etc. that allow the unhindered passage of gas), thin film. Thus, a dense, thin layer of the gas-selective material functions to selectively allow the passage of the desired gas while preventing passage of other gases. Possible gas-selective metals include palladium, platinum, gold, silver, rhodium, rhenium, ruthenium, iridium, niobium, and alloys of two or more thereof. In a preferred embodiment of the invention, the gas-selective material is a hydrogen-selective metal such as platinum, palladium, gold, silver and combinations thereof, including alloys. The more preferred gas-selective material is palladium, silver and alloys of palladium and silver. The most preferred gas-selective material is palladium.

The typical membrane thickness of the gas-selective metal membrane layer can be in the range of from 1 micron to 50 microns. For many gas separation applications, however, a membrane thickness in the upper end of this range may be too thick to provide for a reasonable gas flux that allows for the selection of a desired gas. Also, various prior art manufacturing methods often provide gas separation membrane systems having the gas-selective membrane layers that are unacceptably thick such that they provide for unacceptable gas separation capability. Generally, a membrane thickness that is greater than 20 microns is too large to provide for acceptable separation of hydrogen from a gas stream. Even a membrane thickness greater than 15 microns, or even 10 microns, is not desirable.

The inventive method provides a way of activating the surface of a porous support that has a metal membrane layer thereon but without the chemical treatment of its surface by the application of a chemical activation solution. The purpose of the activation of the surface is to provide for the subsequent laydown of one or more metal membrane layers by deposition of or plating with a gas-selective metal. In certain of the prior art methods of preparing supported metal membrane systems, when multiple metal membrane layers are placed upon the surface of the porous support, there is typically a need for the surfaces of each metal membrane layer to be activated between each plating or deposition step. In the instant method, however, no chemical means is used to provide for surface activation, but, rather, an activated surface is provided by imposing onto the surface of the porous support having the metal membrane layer a particular surface morphology. This surface morphology is such that it provides for an activated surface having enhanced activation properties that allow for the placement upon the activated surface of a subsequent metal membrane layer.

The specific surface morphology that is imposed upon the surface of the supported metal membrane is an important aspect of the inventive method. The prior art indicates that the polishing of the metal surfaces of a membrane between metal deposition or plating steps is important in order to remove imperfections in the membrane layer and to provide for thin, uniform metal layers of metal membrane material upon which further layers of metal may be deposited. It has been thought that it is best to have a highly polished and smooth surface of the metal layer in between the platings. But, it has been found that certain physical characteristics, also referred to herein as surface morphology, of the surface of the metal membrane layer that lies upon a porous support can contribute to surface activation that enhances the placement of additional layers of metal membrane material thereon.

The particular surface morphology that is to be imposed upon the surface of the supported metal membrane concerns the roughness or texture of the surface. Contrary to what was previously believed, it is not as desirable for the surface to which a metal membrane layer is to be applied to be finely polished; but, rather, it should have a certain topology that may be defined by various of the profile roughness parameters that are often used by those skilled in the art to define the roughness properties of a surface. The surface profile may be measured or determined by using any of the methods or means known to those skilled in the art. One example of equipment means for measuring a surface profile to quantify its roughness is a profilometer. Any commercially available profilometer may be used, such as the optical profilometer, identified as the ST400 Optical Profilometer, that is marketed and sold by Nanovea®. This unit may be used to measure, analyze and quantify the surface morphologies and topographies of certain user defined surfaces.

The roughness parameters that may be used to define the surface morphology of the invention include such parameters as the mean surface roughness or arithmetical mean height (Sa), root mean square height or RMS surface roughness (Sq), skewness of the height distribution (Ssk), kurtosis of the height distribution (Sku), maximum peak height (Sp), maximum pit height, also referred to as maximum valley depth, (Sv), and maximum height (Sv). These roughness parameters are well known to those skilled in the art of measuring and characterizing the roughness and other features of surfaces. These particular parameters characterize a surface based on its vertical deviations of its roughness profile from the mean line.

The surface roughness may also be in the form of a lay pattern, which is a repetitive impression upon the surface of the supported metal membrane layer. Examples of surface finish lay patterns include vertical, horizontal, radial, cross-hatched, circular, sinusoidal, oval, elliptical, coil, peanut shaped and other patterns. Suitable and preferred lay patterns and some of the methods and means for impressing or imposing such lay patterns upon the surface of a supported metal membrane are discussed in more detail elsewhere herein.

The surface morphology may be imposed upon the surface of the supported metal membrane by any suitable method or means known to those skilled in the art that will give the desired surface morphology for providing an activated surface. As will be discussed in more detail elsewhere herein, the method of polishing the surface of the supported metal membrane can have a significant effect upon its resulting surface roughness characteristics and the particular lay pattern that is impressed thereon.

To provide for the desired surface activation of the supported metal membrane layer, its surface morphology should be such that it has a roughness characteristic wherein for any selected surface area on the activated surface it has a mean surface roughness (Sa) in the range of from 0.05 microns (μm) to 0.8 microns (μm). It is preferred for the mean surface roughness to be in the range of from 0.1 microns (μm) to 0.6 microns (μm), and, more preferred, from 0.2 microns (μm) to 0.5 microns (μm).

Another surface roughness characteristic of the surface morphology of the supported metal membrane layer is its root mean square roughness, which for any selected surface area on the activated surface, the root mean square roughness (Sq) can be in the range of from 0.1 microns (μm) to 1 microns (μm). It is preferred for the root mean square roughness to be in the range of from 0.15 microns (μm) to 0.8 microns (μm), more preferred, from 0.2 microns (μm) to 0.6 microns (μm), and, most preferred from 0.2 μm to 0.4 μm.

The skewness and kurtosis of the height distribution of the surface of the supported metal membrane may also be used to characterize the surface morphology that affects the activation properties of the surface of the supported metal membrane layer. The surface skewness (Ssk) can have a value in the range of from −0.6 to 0, but it is preferred for the surface skewness to be in the range of from −0.5 to −0.1. It is more preferred for the surface skewness to be in the range of from −0.4 to −0.2. Concerning the kurtosis (Sku) of the height distribution, it can have a value in the range of from 0 to 10, but it is preferred for the kurtosis of the height distribution to be in the range of from 1 to 8. More preferred, it is in the range of from 1 to 6.

The surface roughness may further be characterized by the vertical deviation of the roughness profile from the mean plane. This vertical deviation may be defined by the maximum peak height (Sp) of the roughness profile, which is the height between the highest peak and the mean plane, and by the maximum pit (valley) depth (Sv), which is the depth between the mean plane and the deepest valley.

The maximum height of the profile (Sz) is the difference between the maximum peak height (Sp) and the maximum pit depth (Sv), i.e., Sz=Sp−Sv. The maximum peak height (Sp) of the activated surface can be in the range of from 0.5 μm to 10 μm, but it is preferred to be in the range of from 0.75 μm to 7 μm, and, more preferred, from 1 μm to 4 μm. The maximum pit or valley depth (Sv) of the activated surface can be in the range of from 0.5 μm to 10 μm, but it is preferred to be in the range of from 1 μm to 8 μm, and, more preferred, from 1.5 μm to 6 μm.

The following table presents in summary form the various surface roughness parameters that may be used to characterize the surface morphology that is impressed or imposed upon the surface of the supported metal membrane layer in order to provide for an activated surface that enhances the activation properties for placement thereon of a subsequent metal membrane layer.

TABLE

Roughness Parameters for the Activated Surface of the Supported Metal Membrane

| Surface Roughness Parameter | Broad Range | Preferred Range | More Preferred Range |
|---|---|---|---|
| Mean surface roughness (Sa) | 0.05 to 0.8 μm | 0.1 to 0.6 μm | 0.2 to 0.5 μm |
| mean squared surface roughness height (Sq) | 0.1 to 1 μm | 0.15 to 0.8 μm | 0.2 to 0.6 μm |
| surface skewness (Ssk) | −0.6 to 0 | −0.5 to −0.1 | −0.4 to −0.2 |
| kurtosis (Sku) | 0 to 10 | 1 to 8 | 1 to 6 |
| maximum peak height (Sp) | 0.5 to 10 μm | 0.75 to 7 μm | 1 to 4 μm |
| maximum pit height (Sv) | 0.5 to 10 μm | 1 to 8 μm | 1.5 to 6 μm |

A preferred lay pattern for imposing upon the surface of the supported metal membrane is a cross hatched pattern in the shape of an "X" with the intersecting lines of the cross hatching being placed at particular angles to each other and at particular scratch depths within the surface. It is preferred for the intersecting lines of the cross hatching be at an angle to each other in the range of from 10° (170°) to 90°, or from 25° (155°) to 90°, or from 30° (150°) to 90°. The scratch depth of these intersecting lines should be in the range of from 0.2 μm to 1.5 μm as measure from the outer surface of the metal membrane layer. Preferably, the scratch depth of the intersecting lines is in the range of from 0.1 μm to 1 μm, and, most preferred, the scratch depth is in the range of from 0.2 μm to 0.5 μm.

Any suitable means or method known to those skilled in the art for imposing or impressing into, onto or upon a surface a desired roughness or texture or lay pattern of particular characteristics may be used in the inventive method. There are a wide variety of polishing and machine tools that may be used as means for imposing onto the surface of a supported metal membrane a particular surface morphology including, for example, various mechanical planarization machines and computer numerical controlled machines. The abrasion surfaces may be selected from a variety of polishing pads, abrasive belts and other abrasive surfaces. Examples of abrasives that may suitably be used are disclosed in US Patent Publication 2009/0120287.

Any suitable means or method for placing the subsequent metal membrane layers of gas-selective metal upon the activated surface may be used including those disclosed in U.S. Pat. No. 7,175,694 and US Publication No. US 2009/0120287.

After the placement of each subsequent metal membrane layer upon an activated surface, the subsequent metal membrane layer is annealed. This annealing or heat treating may be done in the presence of or under a gaseous atmosphere that can include simply air, or hydrogen, or oxygen, or any of the inert gases such as nitrogen, helium, argon, neon, carbon dioxide or a combination of any of these. The heat treatment may be conducted under temperature and pressure conditions and for the time periods as are disclosed in US Patent Publication No. US 2009/0120293, which is incorporated herein by reference, or even the heat treatment method disclosed in US2009/0120293 may be used in the method described herein.

The surface activation, the placement of the subsequent metal membrane layer, and the annealing steps may be repeated one or more times to provide the final composite gas separation module of desired properties of the invention.

In one embodiment of the invention, a surface morphology is imposed upon the surface of a tubular porous support (tube) having on its outer surface a layer of gas-selective metal or material so as to provide for an activated surface. The tube may be placed in any suitable turning machine means for rotating the tube about an horizontal axis such as a lathe. An abrading means such as a linear polishing belt or polishing pad or any other suitable abrading device is pressed against the rotating tube. The orientation of the abrading device relative to the tube and the relative rotating tube speed and rotating or moving abrading device speed all may be adjusted in a way so as to provide the desired surface lay patterns and roughness parameters. The rotational speed of the tube typically depends upon the particular equipment used. For instance, buffing machine can operate at rotational speeds of from 3000 rpm to 6000 rpm, or lathes can operate at rotational speeds of from 30 to 500 rpm. When a lathe is used as the rotating means the preferred rotational speed is between 40 to 250 revolutions per minute (rpm).

Referring now to FIG. 1 in which is presented a side elevation view of system 10 that includes a tubular shaped porous support 12 having deposited thereon a metal membrane layer 14. The tubular shaped porous support 12 with its metal membrane layer 14 has a surface 16 and a tubular wall 18 having a wall thickness. The tubular shaped porous support 12 is affixed to a turning device or means such as a lathe (not shown) by holding means 20. Holding means 20 may be any suitable means such as a clamping means using, for example, a chuck or collet, or a faceplace with a clamp or any other suitable means for affixing the tubular shaped porous support 12 to a spinning device such as a spindle. The tubular shaped porous support 12 is rotated about its axis in the direction as shown by arrows 22 by the turning device or means.

Further shown is abrading device or means 24, which may include a planar abrading belt 26 that is moved linearly by the aid of rollers 28 used to move the planar abrading belt 26 in the direction shown by arrow 30. It is understood that the abrading device or means 24 may be any other suitable type of abrading device and it is not limited to planar abrading belts. The abrading device or means 24 may be selected from other suitable devices or means such as polishing pads, brushes, buffing wheels, and the like.

To impose upon surface 16 a desired surface morphology that provides for an activated surface having enhanced activation properties for the placement thereon of an additional metal membrane layer, the planar abrading belt 26 is pressed against the tubular shaped porous support 12 and moved in the directions indicated by arrow 32. The force at which the planar abrading belt 26 is pressed against the tubular shaped porous support 12, the rotational speed at which the tubular shaped porous support 12 is rotated about its axis as shown by arrows 22, the speed at which planar abrading belt 26 is moved along the direction as shown by arrow 30, and the properties of the abrading surface of the planar abrading belt 26 are all properly adjusted and controlled so as to provide for the desired surface morphology to activate surface 16.

FIG. 2 presents an elevation view of section A-A of FIG. 1 showing system 10 from its side. Holding means 20 is shown with tubular shaped porous support 12 placed on the opposite side of holding means 20. Tubular wall 18 is shown with broken lines. Tubular shaped porous support 12 is rotated about its axis in the direction shown by arrow 22. The abrading device or means 24 includes the planar abrading belt 26 that is moved in the direction shown by arrow 30 by rollers 28 that are rotating about their axes in the direction shown by arrows 32. Planar abrading belt 26 is pressed against surface 16 and is moved along the length of tubular shaped support 12. As indicated above, the force at which the planar abrading belt 26 is pressed against the tubular shaped porous support 12, the relative movement speeds of the tubular shaped support 12, planar abrading belt 26, and the properties of the planar abrading belt 26 are adjusted and controlled so as to impose the desired surface morphology upon surface 16.

FIG. 3 is an Nanovea optical profilometer image of an activated surface having a surface roughness with specific characteristics and properties provide for an activated surface ready for the placement thereon of a metal membrane layer.

Referring to FIGS. 4, 5 and 6, these show the top view of geometric patterns that can be created by the systems and methods of the present invention. For example, FIG. 5 is a top view of system 10 shown creating a figure eight-shaped polishing pattern 40 on surface 16 of tubular shaped support 12. The pattern is produced as tubular shaped porous support 12 is rotated about its axis as shown by arrows 22 and abrasive pad or disk 42 contacts surface 16. Abrasive pad or disk 42 is rotated about its axis as shown by arrow 44 and as it is pressed against surface 16 it is moved about in the figure eight-shaped polishing pattern 40 to thereby impose upon surface 16 a desired surface morphology for activating surface 16.

FIG. 5 is a top view of system 10 as depicted in FIG. 4 creating elliptical polishing pattern 50 on tubular shaped porous support 12. Abrasive pad or disk 42 is rotated about its axis as shown by arrow 44 and as it is pressed against surface 16 it is moved about in the elliptical shaped polishing pattern 50 to thereby impose upon surface 16 a desired surface morphology for activating surface 16.

FIG. 6 is a top view of system 10 as depicted in FIG. 4 creating intersecting scratches in circular patterns 60 on tubular shaped porous support 12. Abrasive pad or disk 42 is rotated about its axis as shown by arrow 44 and as it is pressed against surface 16 it is moved about in the intersecting scratches in circular patterns 60 to thereby impose upon surface 16 a desired surface morphology for activating surface 16.

To illustrate certain of the features of an activated surface of a supported metal membrane, presented in FIG. 7 is a representative profilometer trace 70 along a path upon an activated surface of a metal membrane layer. The vertical depth of surface scratches is shown on the y-axis of profilometer trace 70 and the points along the path of the profilometer trace 70 is shown on the x-axis of profilometer trace 70.

That which is claimed is:

1. A method of making a composite gas separation module, wherein said method comprises:

providing a porous support having a metal membrane layer thereon with a surface;

imposing onto said surface and said metal membrane layer a surface morphology having a maximum peak height roughness parameter in the range of from 0.5 to 10 µm thereby providing an activated surface having enhanced activation properties, without chemical treatment of said surface, for the placement thereon of a subsequent metal membrane layer;

placing said subsequent metal membrane layer upon said activated surface; and annealing said subsequent metal membrane layer to provide an annealed metal layer.

2. The method as recited in claim 1, wherein said surface morphology comprises a roughness, wherein for any selected surface area on said activated surface, said any selected surface area has a mean surface roughness (Sa) in the range of from 0.05 µm to 0.8 µm.

3. The method as recited in claim 2, wherein said mean surface roughness within said any selected surface area is in the range of from 0.1 µm to 0.6 µm.

4. The method as recited in claim 3, wherein said roughness within said any selected surface area has a root mean square roughness (Sq) in the range of from 0.1 µm to 1 µm.

5. The method as recited in claim 4, wherein said roughness within said any selected surface area has a skewness in the range of −0.6 to 0.

6. The method as recited in claim 5, wherein said roughness within said any selected surface area has a kurtosis in the range of 0 to 10.

7. The method as recited in claim 6, wherein said surface morphology includes geometric patterns selected from a group consisting of sinusoidal, coil, oval, circular, elliptical, peanut, and figure eight.

8. The method as recited in claim 1, wherein said surface morphology comprises intersecting lines wherein said intersecting lines intersect at angles in the range of from 10-90 degrees and said intersecting lines have a depth in the range of from 0.1 to 1.5 microns.

9. The method as recited in claim 8, wherein said surface morphology comprises a roughness, wherein for any selected surface area on said activated surface, said any selected surface area has a mean surface roughness (Sa) in the range of from 0.05 µm to 0.8 µm.

10. The method as recited in claim 9, wherein said roughness within said any selected surface area has a root mean square roughness (Sq) in the range of from 0.1 µm to 1 µm.

* * * * *